(12) United States Patent
Sanna et al.

(10) Patent No.: US 11,643,346 B2
(45) Date of Patent: May 9, 2023

(54) DEVICE FOR SEWAGE TREATMENT

(71) Applicant: Novideas S.R.L., Sanluri (IT)

(72) Inventors: Edoardo Sanna, Capoterra (IT); Ludovico Sanna, Capoterra (IT)

(73) Assignee: NOVIDEAS S.R.L., Sanluri (IT)

( * ) Notice: Subject to any disclaimer, the term of this patent is extended or adjusted under 35 U.S.C. 154(b) by 377 days.

(21) Appl. No.: 16/479,577

(22) PCT Filed: Feb. 7, 2018

(86) PCT No.: PCT/IB2018/050752
§ 371 (c)(1),
(2) Date: Jul. 19, 2019

(87) PCT Pub. No.: WO2018/146597
PCT Pub. Date: Aug. 16, 2018

(65) Prior Publication Data
US 2021/0363038 A1    Nov. 25, 2021

(30) Foreign Application Priority Data

Feb. 7, 2017    (IT) .................. 102017000013252

(51) Int. Cl.
*C02F 3/12*    (2023.01)
*C02F 3/20*    (2023.01)
(Continued)

(52) U.S. Cl.
CPC .......... *C02F 3/1278* (2013.01); *C02F 3/1236* (2013.01); *C02F 3/20* (2013.01);
(Continued)

(58) Field of Classification Search
CPC ........ B01F 3/04517; C02F 3/223; C02F 3/20; C02F 3/2846
(Continued)

(56) References Cited

U.S. PATENT DOCUMENTS 2,077,907 A    4/1937    Streander

FOREIGN PATENT DOCUMENTS

AT    392261    2/1991
CN    106219745 A    12/2016
(Continued)

OTHER PUBLICATIONS

Goerlich, AT392261, English Machine translation, pp. 1-18 (Year: 1991).*

(Continued)

*Primary Examiner* — Claire A Norris
(74) *Attorney, Agent, or Firm* — Stetina Brunda Garred and Brucker

(57) ABSTRACT

An apparatus for degrading the organic fraction of sewage by means of active biomass, in particular active sludge particles, comprising: —at least one tank (1) adapted to contain the sewage and said active biomass; —at least one hollow structure (6, 106, 206), adapted to be at least partially immersed in the sewage, provided with at least one first opening (61) for letting in the sewage and with at least one second opening (62) for letting out the sewage, wherein the ratio between the area of the at least one first opening (61) and the area of the at least one second opening (62) is equal to at least 5:1; —air delivery means (7, 70) adapted to introduce air inside said at least one structure (6, 106, 206); wherein said at least one first opening (61) is proximal to said air delivery means (7, 70) and said at least one second opening (62) is distal from said air delivery means (7, 70), so that the air delivery means (7, 70) are adapted to generate a flow of sewage from said at least one first opening (61) to said at least one second opening (62).

15 Claims, 7 Drawing Sheets

(51) Int. Cl.
  *C02F 3/22* (2023.01)
  *C02F 101/30* (2006.01)
(52) U.S. Cl.
  CPC ............ *C02F 3/22* (2013.01); *C02F 2101/30* (2013.01); *C02F 2203/006* (2013.01); *C02F 2209/40* (2013.01); *C02F 2301/04* (2013.01)
(58) Field of Classification Search
  USPC ........................................................ 210/629
  See application file for complete search history.

(56) References Cited

FOREIGN PATENT DOCUMENTS

| | | |
|---|---|---|
| DE | 2844934 | 10/1979 |
| JP | 03178395 | 8/1991 |
| JP | 2000176485 | 6/2000 |
| SU | 1613437 | 12/1990 |

OTHER PUBLICATIONS

Eckart, DE2844934, English Machine Translation, pp. 1-6 (Year: 1979).*
Sheng et al, "Extracellular polymeric substances (EPS) of microbial aggregates in biological wastewater treatment systems: A review," Biotechnology Advances, 28 pp. 882-894 (Year: 2010).*

* cited by examiner

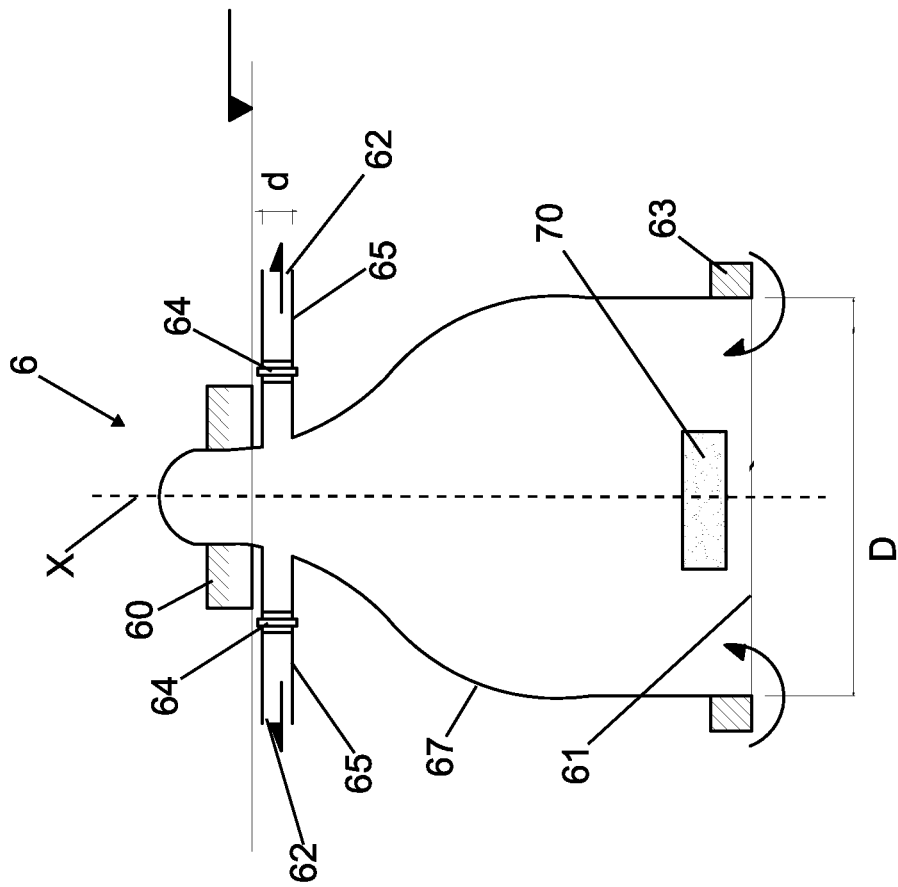
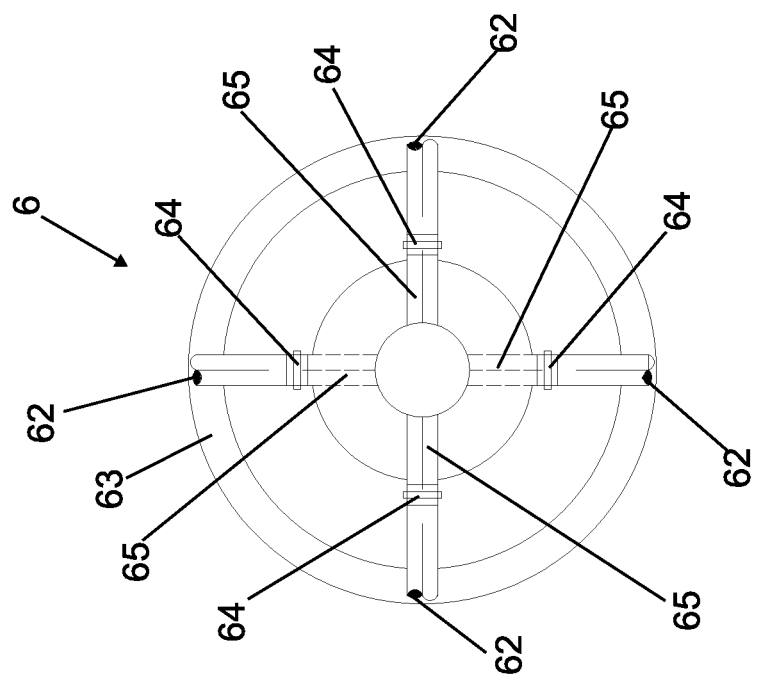
Fig. 4B
Fig. 4A

DEVICE FOR SEWAGE TREATMENT

CROSS REFERENCE TO RELATED APPLICATION(S)

The present application claims priority to PCT International Application No. PCT/IB2018/050752 filed on Feb. 7, 2018, which application claims priority to Italian Patent Application Nos. 102017000013252 filed Feb. 7, 2017, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a system, or apparatus, and to a method for the chemical and biochemical oxidation of organic material by means of the use of granular sludge in aerobic mode. More in particular, the invention relates to a system and a method for degrading waste water and/or organic waste fraction and/or any organic substance in aqueous solution by means of a suspension-cultured aerobic granular sludge system employing Extra-cellular Polymeric Substances (EPSs). EPSs are typically obtained from the active sludge of a purification plant or from the lysis of other biological cellular material.

The system of the present invention is particularly suitable also for modifying existing active sludge purification plants.

BACKGROUND ART

Research on purification plants with granular sludge in aerobic mode advanced significantly, mainly towards reactors that operate in intermittent mode, the so-called "Fill and Draw" reactors, in particular, towards Granular Sequencing Batch Reactors (GSBR).

These reactors have some disadvantages given by the complex management thereof, and by the long times for becoming fully operational.

Another drawback of such reactors is given by the structural requirements thereof. In fact, such reactors must ensure that the active sludge is placed in the optimal condition for producing EPSs, or that the cell lysis, and the resulting release in the liquid medium of the EPSs contained in the cells, occurs, which EPSs, according to the scientific literature, are essential for the generation of granular sludge. To this end, the reactor must be capable of generating high values of oxygen dissolved in the mixture to be treated, and of generating adequate shear and compression forces therein. To obtain such effects, the reactors of the background art are, disadvantageously, very developed upwards. The heights employed are generally greater than 6-7 meters, therefore they adapt with difficulty to the possibility of converting tanks of existing active sludge purification plants to such technology.

Such problem is also shared by the few embodiments of reactors with granular sludge in continuous flow. For the latter, the problem of allowing for an easy and constant management of the process has not yet been solved.

SUMMARY OF THE INVENTION

It is an object of the present invention to solve the aforesaid drawbacks of the background art by providing a system, or apparatus or reactor, and a method for degrading the organic fraction present in a liquid medium by means of suspension-cultured aerobic granular sludge. Such granular sludge is obtained favoring the generation and maintenance inside the reactor of adequate concentrations of Extra-cellular Polymeric Substances (EPSs). Preferably, the generation of such concentrations occurs in a controlled manner.

The invention is also applicable to the degradation of organic waste fraction upon the grinding and dilution thereof, obtaining the liquid medium to be treated.

The present invention achieves at least such object by means of an apparatus for degrading the organic fraction of sewage by means of active biomass, in particular, active sludge particles, comprising:
at least one tank adapted to contain the sewage and said active biomass,
at least one hollow structure, adapted to be at least partially immersed in the sewage, provided with at least one first opening for letting in the sewage and with at least one second opening for letting out the sewage, wherein the ratio between the area of the at least one first opening and the area of the at least one second opening is equal to at least 5:1,
air delivery means adapted to introduce air inside said at least one structure, wherein said at least one first opening is proximal to said air delivery means and said at least one second opening is distal from said air delivery means, so that the air delivery means are adapted to generate a flow of sewage from said at least one first opening to said at least one second opening.

Advantageously, inside said at least one structure a super-oxygenation of said organic fraction and the generation of Extra-cellular Polymeric Substances (EPSs) produced by said active biomass are obtained, i.e. a local increase in the oxygenation of the sewage resulting from the convergence of the air bubbles, and therefore a greater concentration of dissolved oxygen exchanged locally with said organic fraction.

Furthermore, by means of the apparatus of the invention, shear and compression forces are generated in the sewage at the one or more second outlet openings, i.e. outlet sections. The shear and compression forces are mainly obtained by means of the flow produced by the air delivery means and by the marked reduction between the inlet area, or section, and the outlet area, or section. Such shear and compression forces, together with the oxygen present in the air introduced into at least one structure, significantly favor the production of EPSs.

Advantageously, the invention allows to obtain an apparatus which is more compact with respect to the background art.

It should be noted that, in accordance with the invention, the sewage exiting the structure is typically a mixture of sewage and air. Furthermore, the sewage entering the structure may be only sewage or a mixture of sewage and air. Preferably, the aforesaid apparatus is part of an industrial plant.

The present invention also relates to a method for degrading the organic fraction of a fluid by means of active biomass, in particular active sludge particles, wherein an apparatus in accordance with the invention is provided, the method comprising the steps of:
a) introducing the sewage into the tank so that said at least one structure is at least partially immersed in the sewage;
b) introducing air inside said at least one structure by means of the air delivery means, so as to generate a flow of sewage from said first opening 61 to said at least one second opening 62 by means of said air delivery means 7, 70.

In particular, the flow of sewage is generated by the air, i.e., by the drifting of the sewage produced by the rising of the air bubbles which exit from the air delivery means.

The present invention also relates to a structure configured to be arranged in an apparatus in accordance with the invention, said at least one structure being hollow and provided with at least one first opening for letting in fluid and with at least one second opening for letting out the fluid, wherein the ratio between the area of the at least one first opening and the area of the at least one second opening is equal to at least 5:1, preferably is of between 100:10 and 100:1.

Preferably, but not exclusively, the structure is bell-shaped.

Preferably, but not exclusively, only one first opening and only one second opening are provided. Alternatively, preferably but not exclusively, only one first opening and two or four second openings are provided.

An aspect of the invention relates to a plant for the treatment of waste water and/or of organic waste fraction and/or of any organic substance in aqueous solution comprising the apparatus in accordance with the invention.

According to an aspect of the present invention a suspension-cultured aerobic granular sludge system is provided. The generation of such granular sludge is obtained favoring the production of and employing Extra-cellular Polymeric Substances (EPSs) in a reactor in continuous flow. Advantageously, the use of porous support masses, in particular physical masses, for the adhesion, stratification and development of the biomass, i.e. of such granular sludge, is not required.

According to another aspect of the present invention, a preferably, but not exclusively, continuous feeding system is provided, which comprises contiguous compartments in which a different concentration of EPSs may be achieved.

According to another aspect of the present invention, a preferably, but not exclusively, continuous feeding system is provided, which, to achieve the conditions required for the greater production of EPSs by the bacteria characteristic of active sludge purification plants or the cell lysis thereof with the resulting release of the EPSs contained in the cells thereof, provides for the employment of one or more structures arranged inside the oxidation tank, having the function of concentrating, in particular of converging, the air bubbles to locally increase oxygenation. Preferably, such structures are substantially bell-shaped with at least one lower opening and at least one upper opening. Air is insufflated inside the structures by means of the air delivery means, which preferably comprise porous or perforated diffusers. To this end, the air coming from the ventilation network, typical of the reactors, may be conveyed or ad hoc air delivery means may be provided.

According to another aspect of the present invention, a preferably, but not exclusively, continuous feeding system or apparatus is provided, which provides for the employment of one or more substantially open bell-shaped structures arranged inside the oxygenation tank, and in which a local increase in the sewage oxygen exchange is achieved by means of a considerable narrowing of the outlet section of the oxidation bells, resulting from the convergence of the air bubbles and, by means of such narrowing, shear and compression forces are obtained, required for achieving favorable conditions for the production and release of EPSs by bacterial cells, that is, for the cell lysis thereof or for the significant increase in the release of EPSs resulting from the stress conditions and therefore for the subsequent aggregation and compacting of granular sludge granules.

According to another aspect of the present invention, the open bell-shaped structures may be used in any organic fraction oxidation reactor, and therefore also in discontinuous feeding reactors, so as to significantly increase the concentration of oxygen dissolved in the sewage which leads to the greater release of EPSs in the liquid mixture and therefore to the formation of granular sludge.

According to another aspect of the present invention, a preferably, but not necessarily, continuous feeding system is provided, which considerably favors the formation of granular sludge even in small-sized plants.

According to another aspect of the present invention, a preferably, but not necessarily, continuous feeding system is provided, which produces a sludge remarkably tending to aggregation and therefore easily separable from the liquid phase, in particular by sedimentation, by virtue of the degree of density reached by the granular sludge floc.

According to another aspect of the present invention, a preferably, but not necessarily, continuous feeding system is provided, which provides for the installation of substantially bell-shaped structures inside oxidation tanks both in fixed mode (anchored or resting on the bottom) and, alternatively, in floating mode.

According to another aspect of the present invention, a preferably, but not necessarily, continuous feeding system is provided, in which the exit of the water-sludge mixture from the bell-shaped structures occurs by means of one or more diffusers, the structures of which are provided. Typically, such diffusers comprise a device for adjusting the outlet section, i.e., the structures outlet flow rate.

According to another aspect of the present invention, a preferably, but not necessarily, continuous feeding system is provided, which operates with high concentrations of sludge inside the reactor by virtue of the better sludge sedimentation features, with a resulting perceivable decrease in treatment volumes.

According to another aspect of the present invention, a preferably, but not necessarily, continuous feeding system is provided, which is capable of managing high organic load inlet peaks by virtue of the high content of active sludge in the reactor.

According to another aspect of the present invention, a preferably, but not necessarily, continuous feeding system is provided, in which, following the sludge aggregation and the formation of sludge granules, a multiplicity of chemical and biochemical reactions (for example, carbon fraction oxidation, nitrification, denitrification) occur inside the sludge granule itself, and therefore inside the reactor itself.

According to another aspect of the present invention, a preferably, but not necessarily, continuous feeding system is provided, which system is easily automated and provides for a great process simplicity.

According to another aspect of the present invention, by using the substantially bell-shaped structures, the production of sludge inside the active sludge purification plants may be reduced, since part of it is subject to cell lysis required for the production of EPSs.

According to another aspect of the present invention, by using the substantially bell-shaped structures which favor the production of EPSs, the sludge dehydration features may be increased by means of mechanical dehydration, reducing the use of thickeners, such as, for example, organic polyelectrolytes. In fact, the EPSs present have a thickening function.

Therefore, the present invention provides an oxidation reactor method and system substantially according to the accompanying claims.

The person skilled in the art knows the meaning of aerobic granular sludge. In particular, these are large-sized bacterial aggregates (typically 0.2-5 mm), provided with a high sedimentation rate. Granular sludge may be of different type, depending on the substrate, for example nitrifying, heterotrophic, heterotrophic denitrifying, methane-generating and anammox.

The formation of granules provided with a high sedimentation rate allows for the maintenance of a large amount of biomass inside the system.

The size of the granules is variable, depending on the operational parameters of the reactor and ranges from a few hundred micrometers to a few millimeters.

The aerobic granular sludge system is particularly adapted for the purification of waste water by virtue of the excellent features of the biomass, which aggregates forming a compact structure which quickly sediments and allows to obtain high concentrations of volatile suspended solids inside the reactors and ensures the simultaneous removal of organic substance and nutrients. Such sludge is formed by granulation. Granulation is the process by which the self-immobilization of microorganisms leads to the formation of dense agglomerates containing millions of organisms per gram of biomass, including different bacterial species therewithin. In order for the bacteria to form aerobic granules, the synergistic contribution of multiple physical, chemical and biological conditions, including hydrodynamic shear forces, is required.

Under certain conditions, in particular when adequate oxygen levels are present, such bacteria produce extracellular polymers and the aggregates grow, determining metabolic and genetic changes which strengthen cellular interaction and increase the density of the adherent cells.

The skilled in the art knows the meaning of EPS. Typically, it is an assembly, in varying proportions, of proteins, polysaccharides (carbohydrates), humic acids, nucleic acids, lipids and hetero-polymers such as glycoproteins. Part of these substances, being hydrophobic, separate from water and arrange themselves on the surface with a highly viscous appearance.

The extracellular polymers secreted by the microorganisms are of great importance in the granulation process since, being involved in the adhesion events between cells, they strengthen the structure of the aerobic granular sludge, conferring it long-term stability.

Typically, "suspension cultures" means microorganism cultures, for example bacterial, in the absence of physical supports to which the bacteria may adhere.

In particular, neither gravel nor plastic bodies are provided. Therefore, in suspension cultures, sludge is suspended in the liquid medium.

The dependent claims describe particular embodiments of the invention.

BRIEF DESCRIPTION OF THE FIGURES

A detailed description of a number of exemplary embodiments of the apparatus of the present invention is provided hereby by way of explanation and not by way of limitation, with reference to the accompanying Figures, in which:

FIGS. 4A and 4B show diagrammatic views, respectively a plan and a sectional view, of a component of the apparatus of the present invention according to a first embodiment thereof;

Equal reference numerals refer to equal or similar elements.

DETAILED DESCRIPTION OF THE INVENTION

Figure 1:
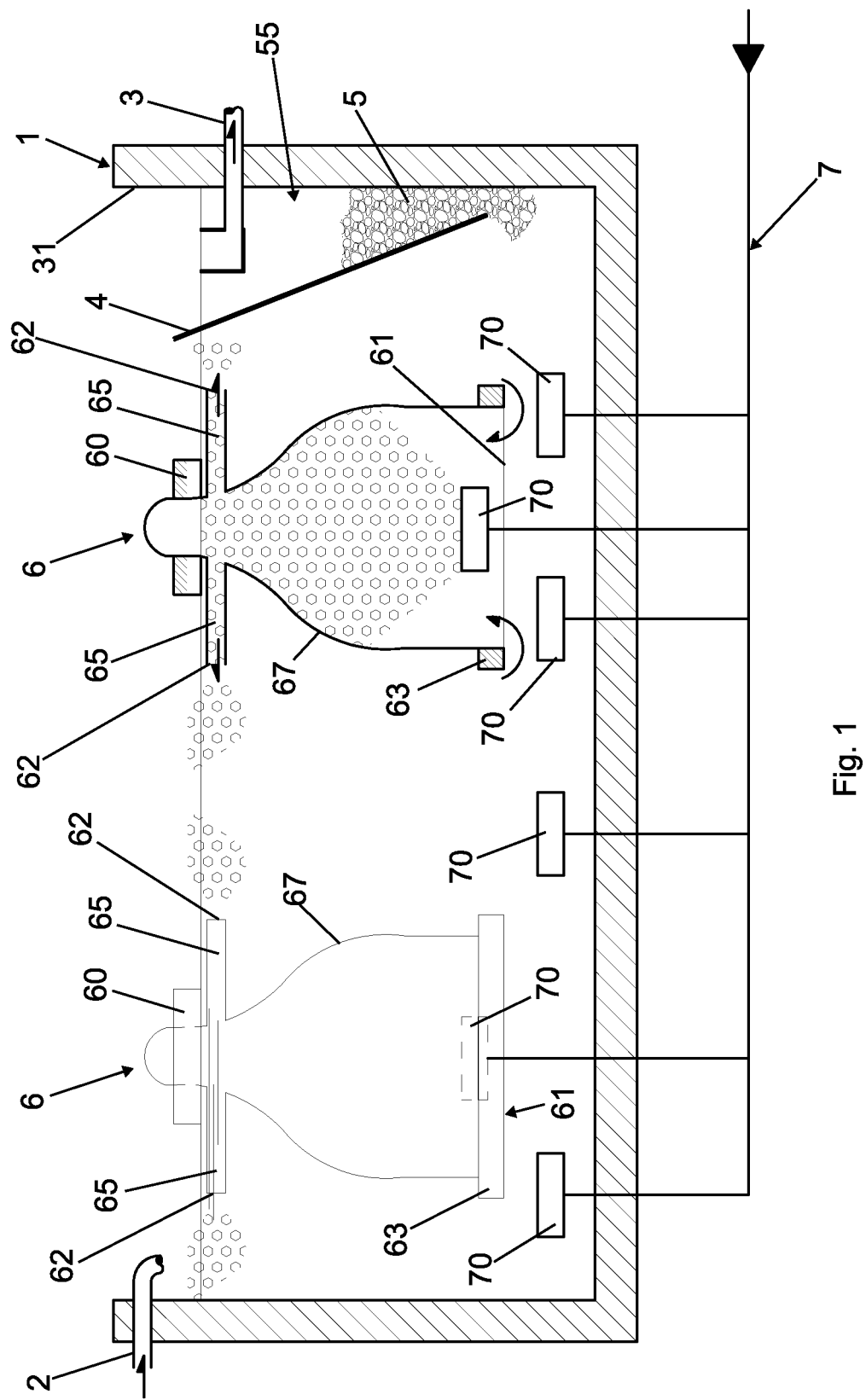
FIG. 1 shows a diagrammatic view of the apparatus of the present invention according to a first embodiment thereof.

With reference to the Figures, in general, an apparatus for degrading the organic fraction of a liquid, in particular sewage, by means of active biomass, in particular active sludge particles, is shown, comprising:

- at least one tank 1 containing the fluid and said active biomass,
- at least one hollow structure 6, 106, 206, at least partially immersed in the sewage, provided with at least one first opening 61 for letting in the sewage and with at least one second opening 62 for letting out the sewage, wherein the ratio between the area of the at least one first opening 61 and the area of the at least one second opening 62 is at least 5:1, preferably of between 100:10 and 100:1,
- air delivery means 7, 70 adapted to introduce air inside said at least one structure 6, 106, 206;
- wherein said at least one first opening 61 is proximal to said air delivery means 7, 70 and said at least one second opening 62 is distal from said air delivery means 7, 70, so that the air delivery means 7, 70 are adapted to generate a flow of sewage from said at least one first opening 61 to said at least one second opening 62.

Advantageously, inside said at least one structure 6, 106, 206 a local increase in the oxygenation of the sewage is obtained resulting from the convergence of the air bubbles and the generation of Extra-cellular Polymeric Substances (EPSs) produced by said active biomass.

In fact, in particular by virtue of the aforesaid ratio between the openings 61, 62, and more in particular by virtue of the narrowing of the section, in the proximity of or at the one or more second openings 62 there is an increase in the concentration of air, and therefore of oxygen. Furthermore, the turbulent motion regime which is established in the proximity of the one or more second openings 62 causes the sewage to be subjected to shear and compression forces, favoring the generation of EPSs.

As further explained below, the air delivery means 7, 70 preferably comprise one or more porous diffusers.

Advantageously, the flow of sewage from the first opening to the one or more second openings 62 is obtained by virtue of the rising of the insufflated bubbles and therefore of the ascending motion of the liquid.

Preferably, the at least one first opening 61 faces towards the bottom of the tank, in the proximity of which the air delivery means 7, 70 are arranged.

With reference now to FIG. 1, an apparatus according to an embodiment of the invention is diagrammatically shown. The apparatus comprises an oxidation tank 1 or reactor. The oxidation tank may be obtained by modifying an existing tank.

The apparatus, or plant, comprises a tank 1 containing a fluid to be oxidized, typically waste water or organic waste fraction, upon grinding and dilution, or surplus sludge, i.e. in excess, to be subjected to digestion processes.

An inlet pipe 2 for the fluid to be treated is provided, preferably arranged at one side of the tank 1. The treated fluid outlet pipe 3 is preferably arranged at the opposite side of the tank 1 with respect to the inlet pipe 2, so as to create a flow of the fluid to be treated, avoiding hydraulic short-circuits.

Typically, inside the tank 1 a deflector or partition 4 is provided, arranged in the final part of the tank 1, proximal to the outlet pipe 3. The lower end of the deflector 4 is spaced from the bottom of the tank. In the space 55, or zone, delimited by the deflector 4 and by a wall 31 of the tank, where the outlet pipe 3 is provided, mainly the separation of the granular sludge from the aqueous phase occurs. Typically, the deflector 4 is arranged so as to be spaced from the wall 31. Furthermore, it is preferable that the deflector 4 is inclined with respect to the wall 31, so that the end of the deflector 4 proximal to the bottom of the tank is spaced from the wall 31 by a distance smaller than the distance between the end of the distal deflector from the bottom of the tank and the wall 31. Alternatively, the deflector is substantially perpendicular to the bottom of the tank. The deflector 4 has the function of ensuring that the withdrawal of the purified outflow occurs at the lower part of the tank, where there is the lower concentration of EPSs, in particular the hydrophobic ones, which are concentrated in the upper part of the tank, since they tend to arrange themselves along the liquid-air interface and therefore on the surface. At the same time, the forced ascending flow ensures that the sludge which separates in such space 55, delimited by the deflector 4 and by the wall 31, has a filtering effect on the ascending liquid flow which takes place towards the outlet pipe 3.

EPSs are produced by virtue of stress events and cell lysis resulting from the use of the structures 6.

According to the present invention, in fact, means are provided which allow for a concentrated local transfer of oxygen to the active sludge, in particular, at least one structure 6 is provided (two of the structures 6 are shown in the Figure). Each structure 6 is hollow. In particular, it delimits a circumscribed volume inside the tank 1, and the structure 6 is arranged in a condition partially or totally immersed in the tank 1.

Each of the two structures 6 is substantially bell-shaped. The structures 6 are partially immersed in the tank 1 and maintained in a floating condition, by virtue of the presence of one or more floaters 60 preferably arranged on the top thereof. Alternatively, the structures are in a fixed position, preferably fastened to the bottom of the tank, by means of fastening means, for example a fastening structure. When the structures are fastened to the bottom of the tank, the lower end of each structure is spaced from the bottom wall of the tank. According to a variant not shown, the structures are suspended, being supported by one or more supporting structures.

The side wall 67 of the structure 6, delimits an inlet opening 61 for letting in the fluid. Preferably, the opening 61 is delimited by a lower end of the side wall 67 of the structure 6. The inlet opening 61 faces towards the bottom of the tank.

In this embodiment, at least two pipes, preferably four pipes 65, are provided, for letting out the fluid. The pipes communicate with the inside of the structure 6 and each end of the pipes delimits a respective outlet opening 62 for the fluid, in particular for the air/liquid mixture, i.e., the air/sewage mixture. Preferably, the pipes 65 extend transversally, for example orthogonally, with respect to the side wall 67 of the bell 6.

The shape of the bell 6 provides that the area of the fluid inlet opening 61 is much greater than the area of each fluid outlet opening 62 or than the sum of the areas of the fluid outlet openings 62. Preferably, the ratio between the area of the section of the inlet opening 61 and the area of the section of each outlet opening 62, or between the area of the section of the inlet opening 61 and the sum of the areas of the outlet openings 62, is at least 5:1, preferably between 100:10 and 100:1, according to the oxidation requirements.

Furthermore, the substantially bell-shaped structures 6, also called bells 6, may convey the air delivered into the tank by means of air delivery elements 70, for example porous diffusers, positioned in the lower part of the tank, connected, by means of tubings, to an air delivery system 7, partially illustrated, of the tank 1. It should be noted that the air may be introduced into the fluid contained in the tank 1 by means known to the skilled in the art.

Exclusively by way of explanation and not by way of limitation, to allow for greater adjustment possibilities, each bell 6 may include, inside, preferably fastened thereto, one or more air diffusers 70 which may be connected to the air delivery system 7.

In general, preferably, the bells 6 are arranged so that at least one delivery element 70, or diffuser, is provided, at each single bell 6, preferably inside thereof.

The arrangement is such that the diffusers 70 create inside the bell 6 a water and air mixture which passes through the latter creating a flow from the opening 61 to the openings 62, for example, substantially from the bottom upwards, as illustrated in the Figure.

In case of a floating installation of the bell, the floating body 60 is provided on the upper part of the bell 6, adapted to support it in a floating condition (i.e., detached from the bottom of the tank 1). Similarly, a ballast body 63 is preferably provided at the lower part of the bell 6, so as to ensure the vertical positioning of the bell 6 inside the tank 1.

Figure 2:
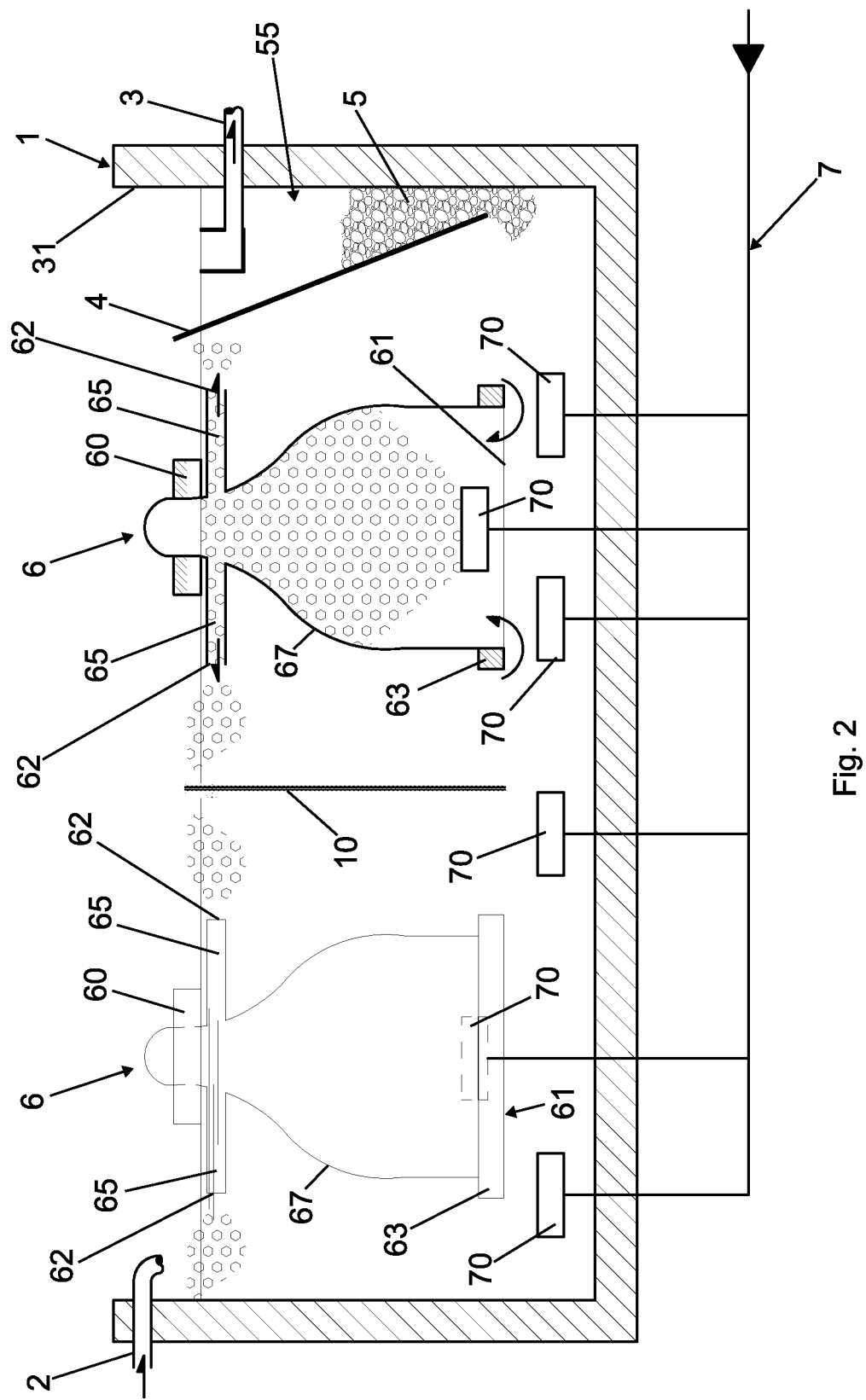
FIG. 2 shows a diagrammatic view of the apparatus of the present invention according to a second embodiment thereof.

With reference now to FIG. 2, an apparatus according to another embodiment of the invention is diagrammatically shown. The apparatus comprises an oxidation tank 1 or reactor. For illustrative clarity, equal parts will have equal names and the detailed description thereof is omitted hereby because given earlier and valid also for this embodiment.

The embodiment shown in this Figure differs from the preceding one in that it provides for one or more intermediate partitions or walls 10 (only one thereof being shown in the Figure) arranged in the tank 1. The partitions 10 are provided with a passage gap in the lower part thereof, or in other words, the lower end of each partition 10 is spaced from the bottom of the tank. Preferably, the partitions 10 are oriented so as to extend in a direction substantially perpendicular to the bottom of the tank. The distance between the lower end of each partition 10 and the bottom wall of the tank is typically identified based on the hydraulic flows of the system, and varies between 10 cm and 1.5 m. Exclusively by way of explanation, each partition 10 is fastened to two opposite walls of the tank.

The arrangement of the partitions 10 is such that the space delimited by the partitions and by the walls of the tank 1 defines a series of compartments which are mutually communicating. In the embodiment shown in FIG. 2 only one partition 10 is provided. The viscosity of the mixture, resulting from the different concentration of the hydrophobic component of EPSs, may assume different concentration values in the various compartments. Preferably, the oxygen concentration and the viscosity of the mixture decrease in a direction which goes from the inlet pipe 2 towards the outlet pipe 3. Preferably, each compartment comprises at least one bell 6. For example, each compartment may comprise one or more bells 6. Therefore, a sequence of compartments defined by the partitions 10, which may be characterized by different concentrations of EPSs, is achieved.

Figure 2A:
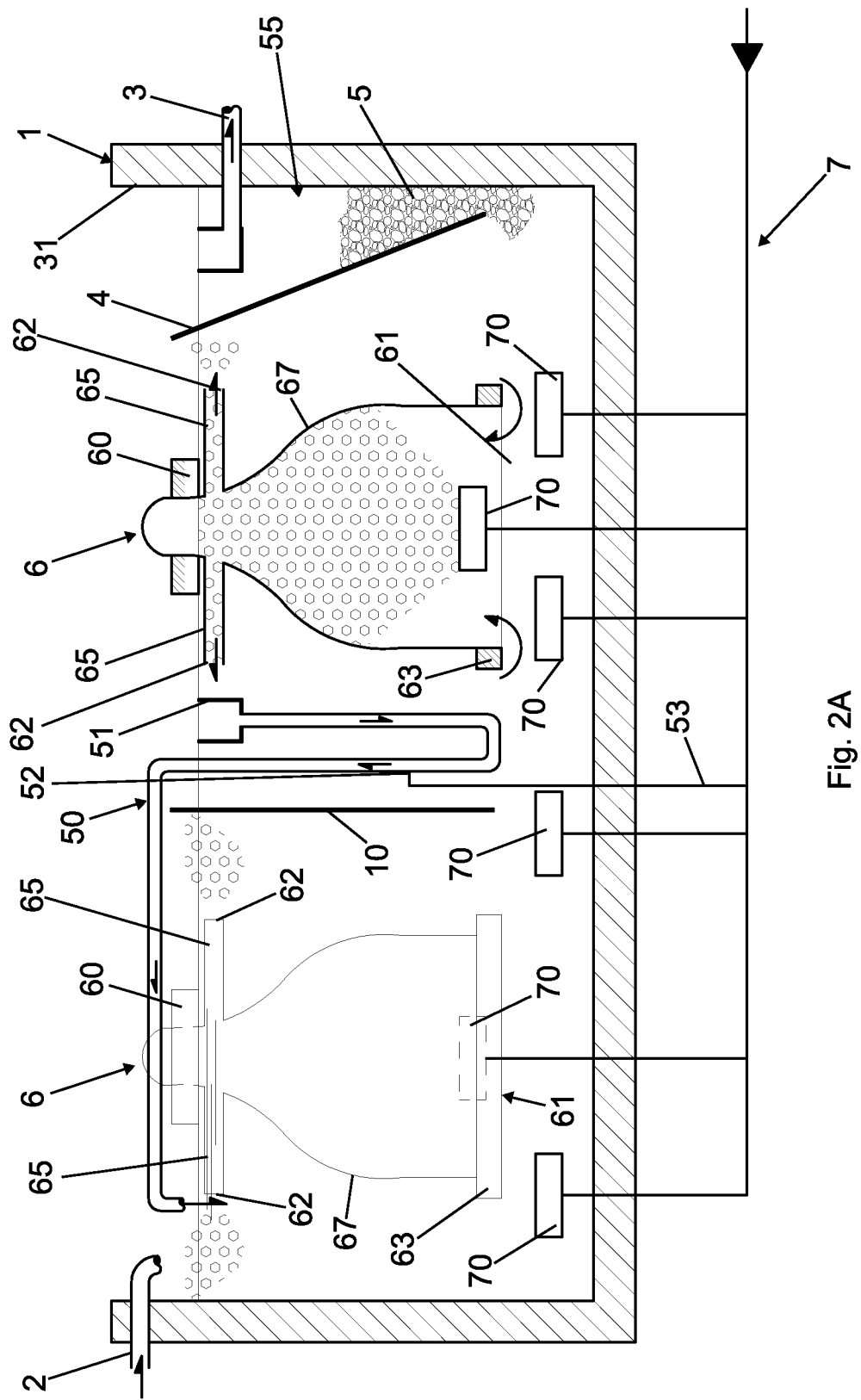
FIG. 2A shows a diagrammatic view of a variant of the apparatus of the invention.

To increase such effect, as shown in the variant of FIG. 2A, in one or more of these compartments a tubing 50 may be present, for recirculating the lighter sludge and the hydrophobic EPSs, which are therefore located in the proximity of or at the surface of the mixture to be treated.

In particular, the tubing 50 comprises an inlet section or opening 51 arranged so as to channel inside it lighter sludge and/or hydrophobic EPSs from the surface of the mixture. In particular, the inlet opening 51 faces upwards, and the end of the tubing 50 is below the free surface of the fluid. The tubing 50 flows into a compartment which is upstream, from the hydraulic point of view, with respect to that in which the inlet section 51 of the tubing 50 is provided.

The recirculation is typically performed by means of the depression created following the insufflation of air at the air inlet point or opening 52 in the ascending line portion of the tubing 50, i.e. where the fluid is directed upwards. In particular, a pipe 53 connects the tubing 50, at the air inlet point 52, to the air delivery system 70.

Preferably, for the embodiments of FIGS. 1, 2 and 2A, in the final part of the tank 1 (i.e., downstream of the hydraulic circulation) there is a zone 55 of partial calm during the operation of the apparatus, in which the separation of the liquid phase from the sludge phase, by means of sedimentation and filtering, and the formation of a fluid layer of granular sludge 5, capable of physically filtering the hydraulic flow exiting the reactor, occur.

Such zone 55 is preferably delimited by the deflector 4 and by the wall 31 of the tank, which delimit a lower opening. The partition may be substantially perpendicular to the bottom of the tank or inclined. Thereby, the granular sludge layer ensures the filtering of the effluent as well as ensuring a greater permanence of the EPSs in the tank, since, naturally or following the flotation produced by the air bubbles, they tend to arrange themselves in the upper part of the tank, or of the compartment where such deflector 4 is positioned. In particular, the hydrophobic component of the EPSs is arranged in the upper part of the tank.

The presence of the deflector 4 and of the fluid granular sludge 5 bed also allows to retain inside the tank floating substances and "ash" formed during the cell lysis step, preventing them from being drifted towards the outlet pipe 3 in the outflow. The flotation thereof is also facilitated by the delivery of micro-bubbles of air inside the tank.

Figure 3:
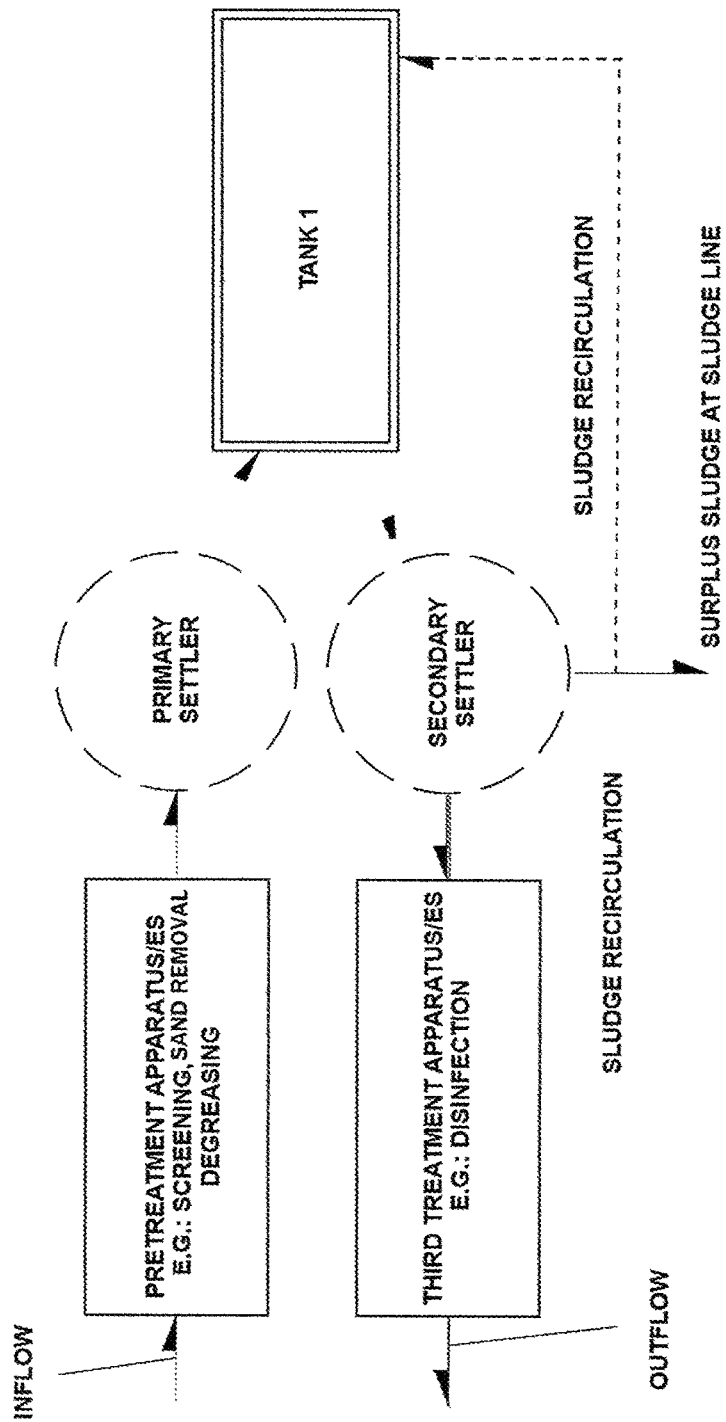
FIG. 3 shows a diagrammatic view of the operating diagram of a treatment plant which embodies the apparatus of the present invention.

With reference now to FIG. 3, a layout of the purification plant which embodies one or more apparatuses according to the present invention is shown diagrammatically, by way of explanation.

The treatment parts or sections of the plant which in the Figure are shown with a broken line indicate the possibility thereof of being omitted as a result of having made the modification to the plant by embodying the apparatus of the present invention.

In fact, given the high oxidation potential of the apparatus of the present invention, the presence of the primary settler, upstream of the tank 1, is not required. Furthermore, given the capacity of the granular sludge to perform nitrification and denitrification inside the sludge granule itself, the presence of the denitrification compartment may no longer be required.

In the case of embodying the apparatus of the present invention within an existing active sludge purification plant, the sedimentation may be performed inside the tank 1 itself.

The secondary settler, downstream of the tank 1, may not be required.

With reference now to FIGS. 4A and 4B, a first embodiment of an oxidation bell 6 is diagrammatically shown.

In general, according to the present invention, the bell 6 preferably has a ratio between the inlet section 61, or area of the inlet opening 61, and the outlet section 62, or area of the outlet openings 62, of the liquid which may vary preferably from 100:1 to 100:10 in accordance with the oxidation potential required. The total outlet surface is given by the sum of the areas of the openings 62.

According to this embodiment, the possibility of varying the aforesaid areas reduction ratio by means of respective adjustment devices 64 located directly in the outlet pipes 65 (better described below) of the water-air mixture is provided. Such adjustment devices 64, preferably, operate by varying the internal section of each pipe 65. The aforesaid ratio between the areas may therefore be varied, still remaining of at least 5:1, preferably between the limits 100:1-100:10.

Alternatively, the same result may be obtained by means of a single centralized adjustment device mounted on the top of the bell (not shown in these figures).

Alternatively, a similar result may be obtained by adjusting the flow rate of the air insufflated in the diffuser/s 70.

More in detail, the bell 6 has a lower edge which is preferably circular, which delimits the opening 61 (inlet section) for letting in the liquid. A ballast 63 for stabilizing the bell 6 is fastened to the edge. In such case, typically, at least one floater element 60, fastened at the top part of the bell 6 is provided.

Typically, it is provided that the floater 60 is arranged and configured so that the bell 6 is partially or totally submerged, in particular, in its development, and that the pipes 65 are preferably located beneath the free surface of the fluid (see FIGS. 1 and 2). It should be noted that a skilled in the art is capable of determining the features and the position of the floater to obtain such result.

Typically, the lower end of the bell is arranged at a distance between 30 cm and 1 m from the bottom of the tank. The internal diameter D of the bell at the lower section 61 depends on the size of the tank and on the features of the sewage to be purified. Preferably, the internal diameter of the bell 6 at the lower section 61 is of between 0.5 m and 5 m. At the top part of the bell 6 at least one outlet pipe 65 is provided, which delimits a respective opening 62. For example, two or four outlet pipes 65 may be provided. Each outlet pipe 65 branches off from the top portion of the bell, which has an internal diameter smaller than the internal diameter of the section 61. Preferably, each outlet pipe 65 extends from the side wall 67 of the bell 6, in a direction substantially perpendicular to the vertical axis X of the respective bell 6. Preferably, when four outlet pipes 65 are provided, they are aligned two by two, so as to substantially form a cross. Preferably, the internal diameter D of each outlet pipe 65, and of the respective opening 62, is between 5 and 20 cm.

Preferably, the extrados of each outlet pipe 65 is arranged beneath the free surface of the liquid in the tank and at a distance from the free surface of the liquid of between 5 and 100 cm.

In this case, being two or four outlet openings 62 provided, the total outlet surface is given by the sum of the areas of each outlet section 62, net of any constrictions made to operate the aforesaid flow rate adjustment.

According to this embodiment, the bell 6 is configured to float. Alternatively, it may be provided that the bell rests or is anchored to the bottom of the tank. In such case, the bell may provide for special support bases (not shown in the Figure).

Figure 5A:
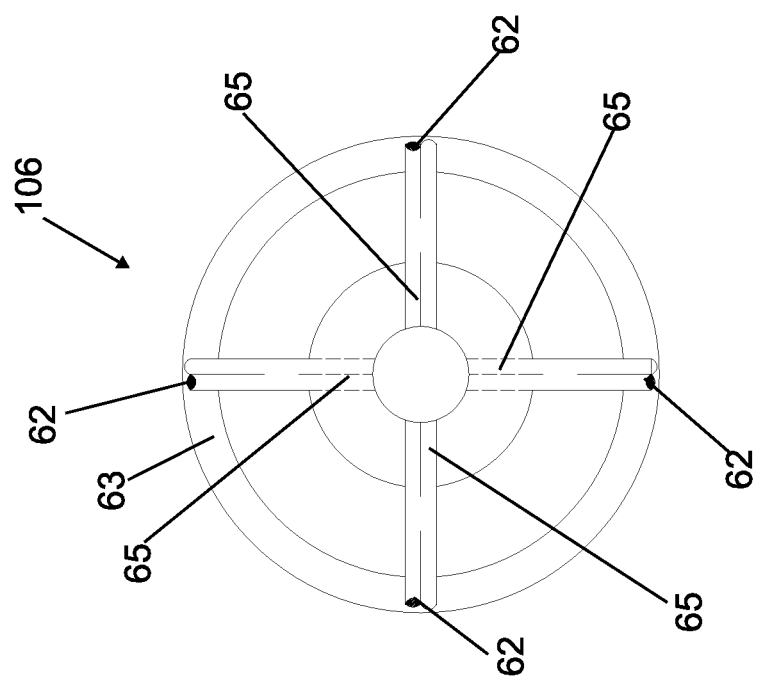
FIGS. 5A and 5B show diagrammatic views, respectively a plan and sectional view, of a component of the apparatus of the present invention according to a second embodiment thereof.
Figure 5B:
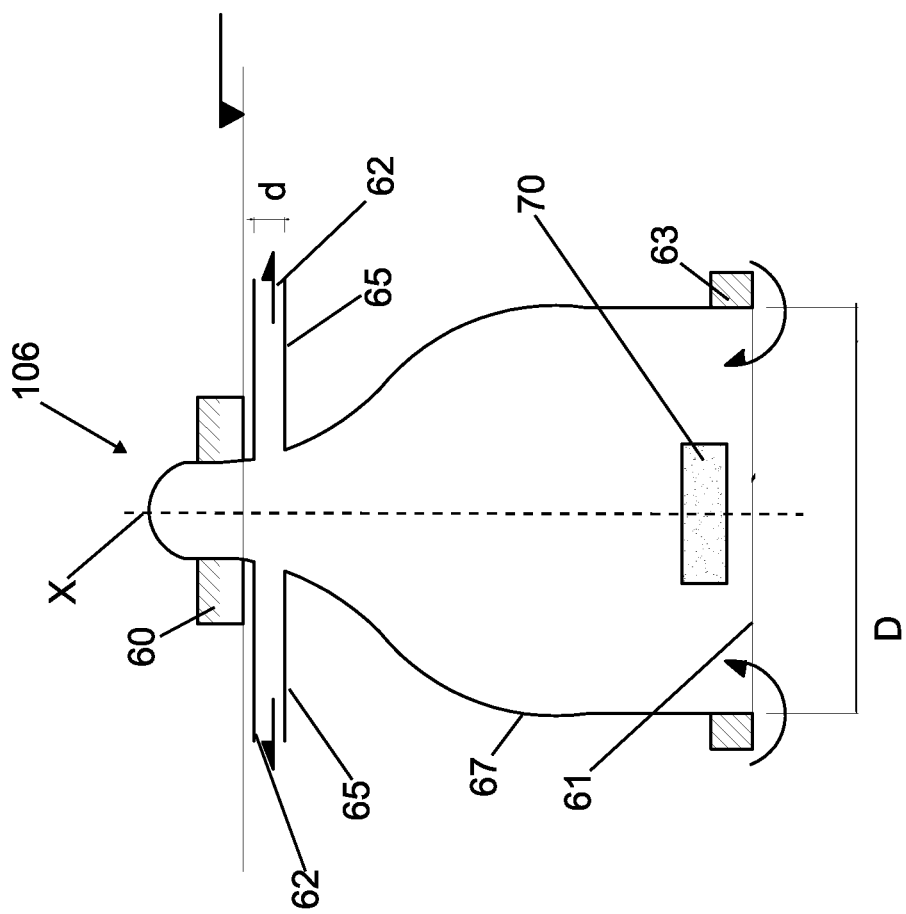

With reference now to FIGS. 5A and 5B, a second embodiment of an oxidation bell 106 is diagrammatically shown.

For illustrative clarity, equal parts will have equal names and the detailed description thereof is omitted hereby because given earlier.

According to this embodiment, the bell 106 is devoid of any device for the adjustment of the exiting flow rate, i.e., the devices 64 of the preceding embodiment. In particular, the bell 106 has a water-air mixture inlet 61 and outlet 62 sections ratio which is established as constant, i.e., not variable during operation. According to the operation requirements of a given plant, such ratio between the inlet 61 and outlet 62 surfaces of the sewage is established during the step of constructing the bell 6 and is at least of 5:1, or in other words, the area of the first opening 61 is at least 5 times greater than the area of the second opening 62. Preferably, the ratio between the area of the first opening 61 and the area of the second opening 62 is of between 100:1 and 100:10, in accordance with the oxidation potential required.

In this case the superoxidation potential of the bell may be adjusted by varying the amount of air insufflated by means of the diffuser/s 70. For the operation of the system, the outlet pipes 65 are preferably located beneath the free surface of the liquid (FIGS. 1 and 2) and have the function of facilitating the mixing of the mixture by conveying the flow away from the bell 106.

As in the previously described embodiment of the bell, the lower end of the bell is preferably arranged at a distance between 30 cm and 1 m from the bottom of the tank. The internal diameter D of the bell 106 at the lower section 61 depends on the size of the tank and on the features of the sewage to be purified. Preferably, the internal diameter D of the bell 6 at the lower section 61 is of between 0.5 m and 5 m. At the top part of the bell 106 at least one outlet pipe 65 for the mixture is provided, which delimits a respective opening 62. For example, two or four outlet pipes 65 may be provided. Each outlet pipe 65 branches off from the top portion of the bell, which has an internal diameter smaller than the internal diameter of the section 61. Preferably, each outlet pipe 65 extends in a direction substantially perpendicular to the vertical axis X of the respective bell 6. Preferably, when four outlet pipes 65 are provided, they are aligned two by two, so as to substantially form a cross. Preferably, the internal diameter D of each outlet pipe 65 is between 5 and 20 cm.

The total outlet surface is given by the sum of the areas of the openings 62.

Also for this embodiment, a floating application is shown in the Figures, but alternatively, the bell may rest on the bottom of the tank, being provided with dedicated support bases.

Figure 6B:
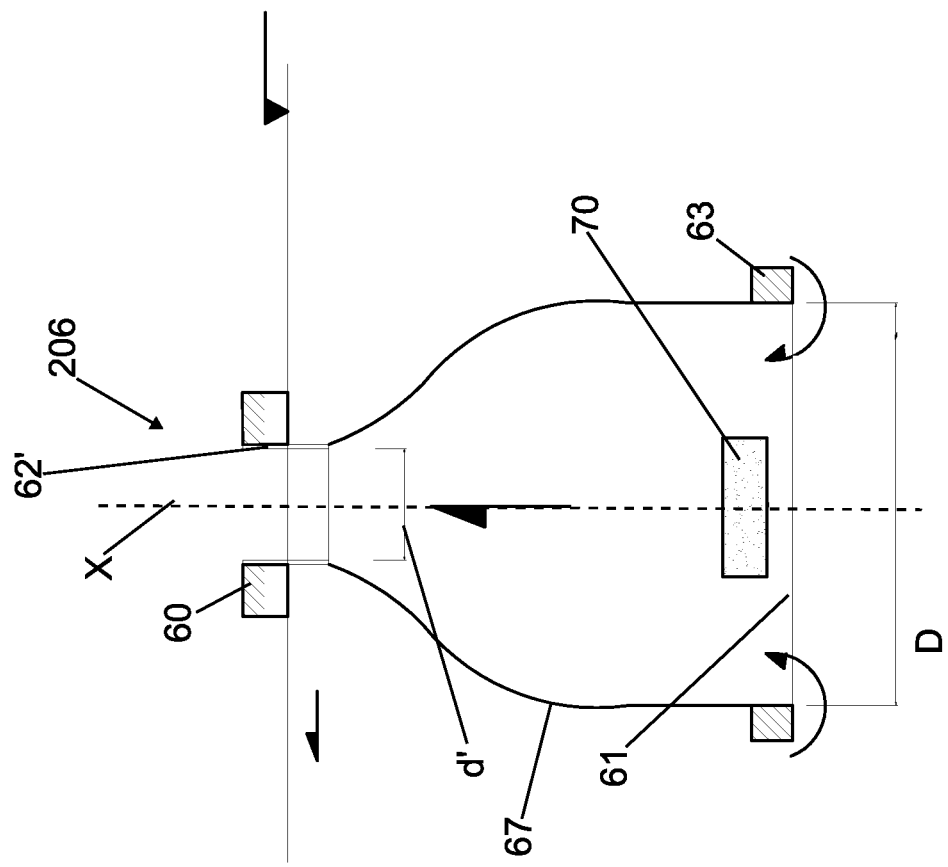
FIGS. 6A and 6B show diagrammatic views, respectively a plan and a sectional view, of a component of the apparatus of the present invention according to a third embodiment thereof.
Figure 6A:
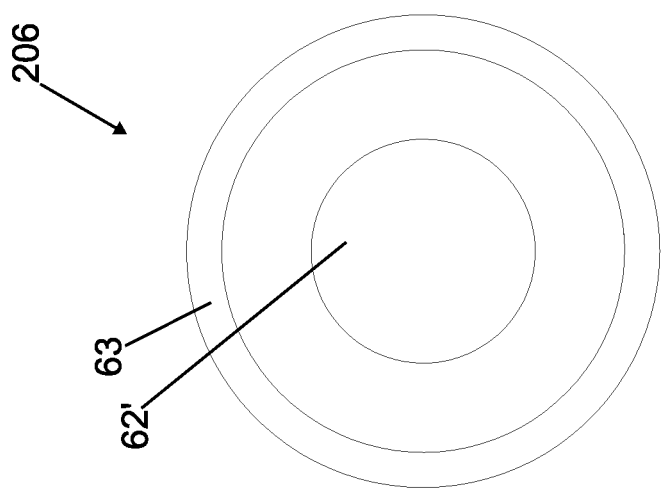

With reference now to FIGS. 6A and 6B, a third embodiment of an oxidation bell 206 is diagrammatically shown.

For illustrative clarity, equal parts will have equal names and the detailed description thereof is omitted hereby because given earlier.

According to this embodiment, the bell does not have the outlet pipes previously described. The bell 206 is provided with an opening 62', opposite to the lower opening 61. In particular, the upper edge of the bell which delimits the opening 62' has an internal diameter smaller than the internal diameter D of the lower edge of the bell 206, which delimits the lower opening 61.

Similarly to the preceding embodiments, also this embodiment provides that the ratio between the inlet section 61 and the outlet section 62 of the liquid is at least of 5:1, preferably of between 100:1 and 100:10.

For the operation, the upper outlet surface 62 of the water/air mixture is preferably located, also in this case, beneath the free surface of the mixture. In this case the superoxidation potential of the bell may be adjusted by varying the amount of air insufflated by means of the diffuser/s 70.

The Figures show a floating application. Alternatively, the bell may rest on the bottom of the tank by means of special support bases (not shown in the Figures).

It should be noted that, although the description has been given with particular reference to bell-shaped structures, the structures may also have a different shape, for example frustoconical.

Advantages

The system of the present invention has many advantages.

According to an advantageous aspect, the organic substance may be degraded in aqueous solution by means of a suspension-cultured aerobic granular sludge system characterized by reduced energy costs and high speed of separation between the active sludge and the purified water.

According to another advantageous aspect, the system may be easily adapted for modifying existing active sludge purification plants.

According to another advantageous aspect, an aqueous phase system for the low-cost oxidation of the organic waste fraction may be constituted.

According to another advantageous aspect, the chemical and biochemical oxidation of strongly polluting sewage of organic origin may be allowed.

According to another advantageous aspect, operating with considerable localized oxidation potential and, at the same time, with reduced energy consumption may be possible.

According to another advantageous aspect, operating in a continuous feeding reactor instead of in intermittent "fill and draw" mode, and controlling the concentration of EPSs in the tank, maintaining it within an optimal range and activating the production thereof when below such range, may be possible.

According to another advantageous aspect, the surplus sludge may be transformed into EPSs inside the oxidation tanks of active sludge purification plants or in the aerobic digestion tanks of the sludge of the same plants.

According to another advantageous aspect, the surplus sludge of active sludge purification plants may be provided with better mechanical dehydration conditions by virtue of the presence of EPSs which favor the flocculation of sludge and therefore a reduced use of thickening products.

The invention claimed is:

1. An apparatus for degrading the organic fraction of sewage by means of active biomass, comprising:
   at least one tank adapted to contain the sewage and said active biomass, the sewage defining an upper level line within the at least one tank;
   at least one hollow structure, adapted to be at least partially immersed in the sewage, provided with at least one first opening for letting in the sewage and with at least one second opening for letting out the sewage, wherein the ratio between the area of the at least one first opening and the area of the at least one second opening is equal to at least 5:1, the at least one hollow structure being configured such that the at least one second opening is located below the upper level line and immersed within the sewage when the at least one hollow structure is at least partially immersed in the sewage; and
   an air delivery device adapted to introduce air inside said at least one hollow structure;
   wherein said at least one first opening is proximal to said air delivery device and said at least one second opening is distal from said air delivery device, so that the air delivery device is adapted to generate a flow of sewage from said at least one first opening to said at least one second opening.

2. The apparatus according to claim 1, wherein said at least one hollow structure is bell-shaped.

3. The apparatus according to claim 1, wherein the ratio between the area of the at least one first opening and the area of the at least one second opening is between 100:10 and 100:1.

4. The apparatus according to claim 1, wherein, when more than one second opening is provided, the ratio between the area of the at least one first opening and the sum of the areas of the second openings is equal to at least 5:1.

5. The apparatus according to claim 1, wherein said at least one hollow structure has a side wall, and wherein said at least one first opening is delimited by a lower end of the side wall.

6. The apparatus according to claim 1, wherein there is provided a second opening of said at least one second opening is delimited by an upper end of a side wall of the at least one hollow structure.

7. The apparatus according to claim 1, wherein there is provided at least one outlet pipe which extends transversally from a side wall of the at least one hollow structure, wherein said at least one outlet pipe communicates with the inside of the at least one hollow structure and delimits a second opening of said at least one second opening.

8. The apparatus according to claim 7, wherein there are provided at least two outlet pipes, wherein each of the at least two outlet pipes delimits a respective second opening of said at least one second opening.

9. The apparatus according to claim 1, wherein said at least one hollow structure comprises a floating body configured to make the at least one hollow structure float in the sewage.

10. The apparatus according to claim 1, wherein said at least one first opening is delimited by a portion of the at least one hollow structure having an internal diameter greater than the rest of the at least one hollow structure.

11. The apparatus according to claim 1, wherein there is provided at least one partition, adapted to be at least partially immersed in the sewage, which divides the at least one tank into mutually communicating compartments.

12. The apparatus according to claim 11, wherein there is provided at least one tubing, for recirculating fluid from one compartment to another compartment of said mutually communicating compartments.

13. The apparatus according to claim 1, wherein, when more than one second opening is provided, the ratio between the area of the at least one first opening and the sum of the areas of the second openings is between 100:10 and 100:1.

14. The apparatus according to claim 1, wherein the air delivery device includes a diffuser.

15. A method for degrading the organic fraction of sewage using active biomass, wherein an apparatus is provided according to any one of the preceding claims, the method comprising the steps of:
   a) introducing the sewage into the at least one tank so that said at least one hollow structure is at least partially immersed in the sewage; and
   b) introducing air inside said at least one hollow structure via the air delivery device, so as to generate a flow of sewage from said at least one first opening to said at least one second opening by means of said air delivery device;
   wherein the at least 5:1 ratio of the area of the at least one first opening and the area of the at least one second opening results in the generation of Extra-Cellular Polymeric Substances.

* * * * *